United States Patent Office 3,198,752
Patented Aug. 3, 1965

3,198,752
METHOD OF PRODUCING TUNGSTEN OXIDE CATALYST AND PRODUCT THEREOF
George Walter Bridger and Peter Andrew Lemin, both of Norton-on-Tees, England, assignors to Imperial Chemical Industries Limited, London, England, a corporation of Great Britain
No Drawing. Filed Dec. 19, 1961, Ser. No. 160,624
Claims priority, application Great Britain, Dec. 23, 1960, 44,264/60
10 Claims. (Cl. 252—467)

This invention relates to a process for producing pelleted tungsten oxide-comprising catalysts suitable for promoting the liquid-phase reaction of water with olefines to give alcohols.

Pelleted tungsten oxide-comprising catalysts are commonly produced by processes which start from a tungstic acid and include a stage in which the tungstic acid in the form of pellets is reduced to a lower valency state, a partial dehydration occurring at the same time. This stage, in order to avoid handling and consequent reoxidation of the catalyst, is performed after charging the catalyst to the deep catalyst bed of the converter in which it is to be used. The catalysts so produced are not entirely satisfactory in that they undergo some disintegration during use. It has now been found that disintegration during use is considerably decreased if the process of producing the catalyst from a tungstic acid includes a stage in which the tungstic acid is dehydrated to a definite extent under carefully controlled conditions, and that at the same time a catalyst so produced exhibits enhanced activity.

According to the invention there is provided an improved process for producing a catalyst from a tungstic acid, which comprises subjecting the tungstic acid in pellet form to a dehydration treatment which decreases its bound water content to between 0.2% and 3% by weight, the dehydration treatment being conducted under such conditions that during it the pellets suffer substantially no damage as the result of thermal or mechanical shock.

This invention is most valuable for producing a catalyst composition comprising a tungsten oxide as its predominant constituent. Other substances present may be for example oxides such as for example alumina, silica, and titanium dioxide, and polymers such as for example polytetrafluoroethylene as described in the specification of our co-pending U.S. Application No. 138,605.

The tungstic acid used as starting material is preferably predominantly of the formula $H_2WO_4$. The bound water content of $H_2WO_4$ is about 7.3% by weight: the degree of dehydration to be used in the process of the invention is preferably to a production having a bound water content in the range 0.5% to 2% by weight, especially 0.5% to 1% by weight.

The tungstic acid, without or with other substances, is preferably in the form of pellets made under a pressure in the range 30 to 100 tons per square inch especially 50 to 70 tons per square inch. Preferably the tungstic acid without or with other substances is compacted at a pressure in the range 2 to 20 tons per square inch, then coarsely powdered, before being pelleted.

The dehydration step in performed preferably in beds sufficiently shallow that the pellets remain substantially undamaged by the movement caused by the shrinkage which accompanies the loss of bound water. The depth of pellets is suitably less than a yard and more suitably less than a foot, feor example in the range 0.5 to 6 inches.

The dehydration treatment comprises heating the tungstic acid to an elevated temperature and holding it at that temperature for a period. In order to limit damage to the pellets by thermal shock the rates of heating the tungstic acid to the elevated temperature should preferably be not more than 5° C. per minute, more preferably not more than 3° C. per minute and especially not more than 1.5° C. per minute. No further advantage is gained however by heating at a rate below 0.5° C. per minute. It is also advantageous to limit the rate of cooling if the pellets are cooled after dehydration to not more than 3° C. per minute.

The dehydration treatment preferably includes the step of holding the tungstic acid at a temperature in the range 200° C. to 350° C., for example 250° C. to 300° C., the pressure being atmospheric. The time required varies with the temperature, but the following combination of times and temperature are given by way of example:

(i) Heat to 250° C. to 300° C. over 6 hours, followed by (ii) Hold at 250° C. to 300° C. for 4 hours, followed by (iii) Cool to room temperature over 2 hours.

Preferably the heating to the elevated temperature and the holding at the elevated temperature are effected in a stream of hot gas, for example combustion products of coal gas, the heating of the tungstic acid being substantially entirely by contact with the gas. The prescribed temperatures are measured by thermocouples within the beds of pellets. The dehydration may be effected at other pressures if desired; and at sub-atmospheric pressure it is possible to work at a lower temperature, for example 150° C. On the other hand temperatures above 350° C. are not recommended.

The reduction of the tungstic acid to a lower valency state is effected preferably after the dehydration treatment has been completed. Conveniently for example the dehydration is effected in trays in a gas-heated oven and then the product of the dehydration is transferred to the converter in which the catalysed reaction is to take place, and is there reduced to the lower valency state. Reduction may be effected for example by the action of hydrogen or carbon monoxide or an aliphatic alcohol containing fewer than 4 carbon atoms or a gaseous aliphatic hydrocarbon for example propane, and the lower valency state attained by the reduction should preferably correspond to an oxide of tungsten having a composition in the range $WO_3$ to $WO_{2.5}$.

Catalysts made by the process of the invention are especially valuable in promoting the reaction of water with olefines to give alcohols: in this reaction they show higher activity and greater resistance to disintegration in use than catalysts made by the process described in the preamble of this specification. In particular they undergo only very small, if any, pellet volume changes while in use.

According to a further feature of the invention there is provided a method for the hydration of olefines which comprises reacting in the liquid phase at elevated temperature and pressure water and an olefine in the presence of a catalyst produced by the process of the invention.

As a preferred embodiment of this feature of the invention there is provided a method for the hydration of olefines which comprises reacting in the liquid phase at elevated temperature and pressure water and an olefine in the presence of a catalyst consisting essentially of tungsten oxides and which has been produced by compacting a tungstic acid predominantly of the formula $H_2WO_4$ at a pressure in the range 2 to 20 tons per square inch, coarsely powdering the compacted product, pelleting the coarse powder at a pressure in the range 30 to 100 tons per square inch, heating the pellets to 250° C. to 300° C. at the rate of not more than 3° C. per minute, holding the pellets at 250° C. to 300° C. until their bound water content is in the range 0.5% to 2% by weight, and reducing the material of the pellets to a valency state corresponding to an oxide of tungsten having a composition in the range $WO_3$ to $WO_{2.5}$.

As examples of olefines which may be hydrated by this method there may be mentioned ethylene, propylene and butenes, and also higher olefines such as for example pentenes, hexenes, heptenes, octenes, nonenes.

The method is especially suitable for the hydration of propylene. The preferred temperature for this method is in the range 200° C. to 300° C., especially 230° C. to 290° C. The preferred pressure for this method is in the range 200 to 300 atmospheres gauge, and especially 230 to 270 atmospheres gauge. The proportions by weight of the reactants in the reacting mixture are preferably in the range 1 to 20 parts, especially 2 to 15, and more especially 4 to 8, of water per part of propylene. The proportion of catalyst to reaction mixture preferably corresponds to a space velocity of 2 to 6 litres of liquid reaction mixture per litre of catalyst filled space per hour. The method is suitably carried out continuously: the reaction mixture after passing over the catalyst is fractionally distilled, the unreacted water and propylene being recycled to the converters containing the catalyst.

When operating a method for the hydration of other olefines the conditions will require minor variations from those temperatures or pressures or both which are recommended for the hydration of propylene in order to obtain optimal conversions to alcohol. Thus for example when isobutene is reacted with water to give tertiary butanol the temperature is suitably in the range 160° C. to 220° C., especially about 200° C. When butene-1 or butene-2 is reacted with water to give secondary butanol the temperature is suitably 230° C. to 270° C., especially about 250° C. When ethylene is reacted with water to give ethanol the temperature is suitably 280° C. to 310° C., especially about 300° C., the pressure being about 300 atmospheres.

Heterogeneously catalysed liquid phase reactions may be carried out by the method of the feature of the invention for long periods without interruptions due to physical breakdown of the catalyst, hence the process enables a considerable saving in operating costs to be achieved.

The invention is illustrated by the following examples:

*Example 1*

A sample of tungstic acid, powdered to pass a 12 B.S. sieve, was mixed with 1% graphite and pelleted under a pressure of about 100 tons per square inch to give cylindrical pellets 1/8″ x 1/8″, then divided into two equal parts. Part A was dehydrated in layers about 1″ thick in a stream of burnt town gas by heating to 250° C. over 6 hours, and holding at 250° C. for 4 hours, whereafter it was cooled to room temperature over 2 hours. Part B was not further treated. Then each part was charged to a converter, reduced to a lower oxide of tungsten, and contacted with propylene and liquid water at 250° C., 250 atmospheres pressure. It was observed that the conversion using Part A was 20% higher than using Part B. After an equal period of use, Part A showed substantially no disintegration (1.2% fines), whereas Part B now contained 2.4% fines and was providing considerably greater obstruction to the passage of the reaction mixture.

The converter in this example was a pilot-plant converter containing a 4-foot-deep catalyst bed. The weight ratio of water to propylene was 4.6 to 1 and the space velocity was 4 litres per hour per litre of catalyst-filled space.

*Example 2*

Tungstic acid consisting of substantially pure $H_2WO_4$, finely powdered to pass a 100 B.S. sieve, was compacted under a pressure of about 10 tons per square inch to give cylinders of 3 inches diameter and 1 inch height. These cylinders were broken down to pass a 3/32 inch sieve, and the resulting powder was mixed with 1% of its weight of graphite and formed into cylindrical pellets 3/16 inch x 3/16 inch under a pressure of about 60 tons per square inch. The resulting pellets were placed in trays filled to a depth of 0.5 to 1.5 inches, transferred to an oven, heated over 6 hours to 270° C. to 280° C. and held at this temperature for 4 hours, in a stream of hot gases produced by the combustion of town gas. They were allowed to cool by removing the trays from the oven. These pellets were shown to contain 0.8% by weight of water by heating a weighed sample of them at 600° C. for 4 hours.

A quantity of these pellets (catalyst A) was charged to a plant-scale converter, where they formed beds some 9 feet deep. They were reduced to a lower oxide of tungsten by raising the temperature and pressure in an atmosphere of propane to the levels required for olefine hydration and then contacted with liquid water and propylene in a weight ratio of 4.6 to 1 at 250° C., 250 atmospheres pressure and with a space velocity of 4 litres per hour per litre of catalyst-filled space. Charges of pellets (catalyst B), differing from catalyst A in that they had not been subjected to any separate dehydration treatment, being merely reduced by the propane treatment in the 9 foot deep beds of the converter after pelleting, had been previously used in the same converter and contacted with a similar reaction mixture. It was observed that the conversion of propylene to isopropanol obtained using catalyst A was on average 10% higher than that recorded using catalyst B. After an equal period of use, catalyst A was found to contain a lower percentage of fines than had been recorded using catalyst B and was providing noticeably less obstruction to the passage of the reaction mixture.

We claim:

1. An improved process for producing a catalyst for the liquid phase hydration of olefines, which comprises pelleting a composition consisting essentially of tungstic acid, dehydrating the resulting pellets to a bound water content of between 0.2% and 3% by weight under conditions such that they suffer substantially no thermal or mechanical shock, and thereafter reducing the partly dehydrated tungstic acid to a valency state corresponding to an oxide of tungsten having a composiiton in the range $WO_3$ to $WO_{2.5}$.

2. A process according to claim 1 wherein the tungstic acid is dehydrated to a water content in the range 0.5% to 2% by weight.

3. A process according to claim 1 wherein the tungstic acid is pelleted at a pressure in the range 30 to 100 tons per square inch.

4. A process according to claim 1 wherein the tungstic acid, before being pelleted, is compacted at a pressure in the range 2 to 20 tons per square inch and then coarsely powdered.

5. A process according to claim 1 wherein the tungstic acid is dehydrated in beds loaded to a depth in the range 0.5 to 6 inches.

6. A process according to claim 1 wherein the rate of heating the tungstic acid before dehydration and of cooling the tungstic oxide resulting from dehydration is not greater than 3° C. per minute.

7. A process according to claim 1 wherein the dehydration treatment includes the step of holding the tungstic acid at a temperature in the range 200° C. to 350° C., the pressure being substantially atmospheric.

8. A process according to claim 1 wherein the heating to the dehydration temperature and the holding at the dehydration temperature are effected in a stream of hot gas.

9. A pelleted catalyst consisting essentially of tungsten oxide having a reduced tendency to undergo disintegration during use, said composition being made by pelleting a composition consisting essentially of tungstic acid, dehydrating the resulting pellets to a bound water content of between 0.2% and 3% by weight under conditions such that they suffer substantially no thermal or mechanical shock, and thereafter reducing the partly dehydrated tungstic acid to a valency state corresponding to an oxide of tungsten having a composition in the range $WO_3$ to $WO_{2.5}$.

10. An improved process for producing a catalyst for the liquid phase hydration of olefines which comprises reducing pellets of a composition consisting essentially of tungstic acid to a valency state corresponding to an oxide of tungsten in the range $WO_3$ to $WO_{2.5}$, said pellets being formed by pelleting a composition consisting essentially of tungstic acid, heating the resulting pellets in layers less than one yard deep at the rate of up to 5° C. per minute to a temperature in the range 150–350° C., dehydrating the pellets to a bound water content of between 0.2% and 3% by weight, and cooling the pellets at the rate of up to 3° C. per minute.

References Cited by the Examiner

UNITED STATES PATENTS

| | | | |
|---|---|---|---|
| 1,683,695 | 9/28 | Patrick et al. | 252—467 X |
| 2,137,101 | 11/38 | Spicer | 252—477 X |
| 2,173,187 | 9/39 | Tanner | 260—641 |
| 2,368,580 | 1/45 | Stein et al. | 23—140 |
| 2,536,768 | 1/51 | Reynolds et al. | 260—641 X |
| 2,576,769 | 11/51 | Avedikian | 23—116 |
| 2,694,049 | 11/54 | Reynolds et al. | 260—641 X |
| 2,702,232 | 2/55 | Arnold et al. | 23—140 X |
| 2,749,366 | 6/56 | Foster et al. | 252—467 X |
| 2,755,309 | 7/56 | Reynolds et al. | 260—641 |
| 2,807,655 | 9/57 | Pitwell | 260—641 |
| 2,861,045 | 11/58 | Langer | 260—641 X |
| 2,865,868 | 12/58 | McKinley et al. | 252—467 |
| 2,951,816 | 9/60 | Hogan et al. | 252—467 |
| 2,993,755 | 7/61 | Redanz | 23—140 |

MAURICE A. BRINDISI, *Primary Examiner.*

LEON ZITVER, *Examiner.*